United States Patent
Hayashi

(10) Patent No.: US 11,112,486 B2
(45) Date of Patent: Sep. 7, 2021

(54) RADAR APPARATUS

(71) Applicant: SOCIONEXT INC., Kanagawa (JP)

(72) Inventor: Joji Hayashi, Kanagawa (JP)

(73) Assignee: SOCIONEXT INC., Kanagawa (JP)

(*) Notice: Subject to any disclaimer, the term of this patent is extended or adjusted under 35 U.S.C. 154(b) by 25 days.

(21) Appl. No.: 16/450,444

(22) Filed: Jun. 24, 2019

(65) Prior Publication Data
US 2019/0317186 A1   Oct. 17, 2019

Related U.S. Application Data

(63) Continuation of application No. PCT/JP2017/036980, filed on Oct. 12, 2017.

(30) Foreign Application Priority Data

Dec. 27, 2016 (JP) .............................. JP2016-253032

(51) Int. Cl.
*G01S 7/35* (2006.01)
*G01S 7/03* (2006.01)
(Continued)

(52) U.S. Cl.
CPC .............. *G01S 7/023* (2013.01); *G01S 7/032* (2013.01); *G01S 7/354* (2013.01); *G01S 13/34* (2013.01); *G01S 7/358* (2021.05)

(58) Field of Classification Search
CPC ........... G01S 7/023; G01S 7/354; G01S 13/34; G01S 2007/358; G01S 7/032; G01S 7/358
See application file for complete search history.

(56) References Cited

U.S. PATENT DOCUMENTS 5,861,837 A * 1/1999 Richardson ............. G01S 7/038
342/159
6,249,686 B1   6/2001 Dvorkin et al.
(Continued)

FOREIGN PATENT DOCUMENTS

JP   H10-242876 A   9/1998
JP   2000-201091 A   7/2000
(Continued)

OTHER PUBLICATIONS

K. Lin, Y. E. Wang, C. Pao and Y. Shih, "A Ka-Band FMCW Radar Front-End With Adaptive Leakage Cancellation," in IEEE Transactions on Microwave Theory and Techniques, vol. 54, No. 12, pp. 4041-4048, Dec. 2006, doi: 10.1109/TMTT.2006.885882. (Year: 2006).*

(Continued)

*Primary Examiner* — Matthew M Barker
(74) *Attorney, Agent, or Firm* — McDermott Will and Emery LLP

(57) ABSTRACT

Disclosed is a radar apparatus including: a local oscillator for outputting a local oscillation signal; a transmitter unit; and a receiver unit. The transmitter unit includes: a transmission input configured to receive the local oscillation signal; and a transmitter configured to transmit a transmission signal based on the local oscillation signal that has been received via the transmission input. The receiver unit includes: a reception input configured to receive the local oscillation signal not via the transmission input; a receiver configured to receive a reflection wave based on the transmission signal; a cancel signal generator configured to generate a cancel signal based on the local oscillation signal that has been received via the reception input; and an adder configured to superimpose the cancel signal on a reception signal.

15 Claims, 5 Drawing Sheets

(51) Int. Cl.
*G01S 13/34* (2006.01)
*G01S 7/02* (2006.01)

(56) References Cited

U.S. PATENT DOCUMENTS

| | | | | |
|---|---|---|---|---|
| 7,899,142 | B2* | 3/2011 | Hayashi | H04B 1/525 |
| | | | | 375/346 |
| 8,924,214 | B2* | 12/2014 | Willey | G01S 13/50 |
| | | | | 704/256 |
| 8,957,743 | B2* | 2/2015 | Reuter | G01S 7/354 |
| | | | | 333/18 |
| 9,285,461 | B2* | 3/2016 | Swirhun | G01S 7/03 |
| 9,678,197 | B2* | 6/2017 | Vacanti | G01S 13/02 |
| 10,218,490 | B1* | 2/2019 | Yang | G01S 7/038 |
| 10,649,067 | B1* | 5/2020 | Yang | G01S 7/023 |
| 2005/0225481 | A1* | 10/2005 | Bonthron | H01Q 1/3233 |
| | | | | 342/175 |
| 2006/0273952 | A1* | 12/2006 | Krikorian | H04B 1/525 |
| | | | | 342/198 |
| 2009/0232260 | A1* | 9/2009 | Hayashi | H04B 1/525 |
| | | | | 375/346 |
| 2013/0063299 | A1* | 3/2013 | Proudkii | G01V 3/12 |
| | | | | 342/188 |
| 2014/0315501 | A1* | 10/2014 | Rudell | H04B 1/18 |
| | | | | 455/78 |
| 2015/0061922 | A1* | 3/2015 | Kishigami | G01S 13/42 |
| | | | | 342/147 |
| 2016/0178730 | A1 | 6/2016 | Trotta et al. | |
| 2016/0266245 | A1 | 9/2016 | Bharadia et al. | |
| 2016/0306034 | A1 | 10/2016 | Trotta et al. | |
| 2017/0168140 | A1 | 6/2017 | Hosokawa et al. | |
| 2017/0214427 | A1* | 7/2017 | Chayat | H04B 1/48 |
| 2018/0074168 | A1* | 3/2018 | Subburaj | G01S 7/023 |
| 2018/0074173 | A1 | 3/2018 | Trotta et al. | |

FOREIGN PATENT DOCUMENTS

| | | |
|---|---|---|
| JP | 2002-533979 A | 10/2002 |
| JP | 2007-71751 A | 3/2007 |
| JP | 2010-197283 A | 9/2010 |
| JP | 2016-166859 A | 9/2016 |
| WO | 2016/031108 A1 | 3/2016 |
| WO | 2016/168334 A1 | 10/2016 |

OTHER PUBLICATIONS

International Search Report and Written Opinion of ISA for PCT/JP2017/036980, dated Jan. 9, 2018; with partial English translation.

* cited by examiner

RADAR APPARATUS

CROSS-REFERENCE TO RELATED APPLICATIONS

This is a continuation of International Application No. PCT/JP2017/036980 filed on Oct. 12, 2017, which claims priority to Japanese Patent Application No. 2016-253032 filed on Dec. 27, 2016. The entire disclosures of these applications are incorporated by reference herein.

BACKGROUND ART

The present disclosure relates to a radar apparatus.

A continuous wave radar apparatus is known as a radar apparatus for distance measurement and velocity measurement. The continuous wave radar apparatus analyzes a difference in frequency between a transmission signal and a signal (reception signal) reflected from a target after the transmission signal is transmitted to the target, and measures a moving velocity of the target with respect to the radar apparatus and/or a distance to the target.

In such a radar apparatus, the transmitter unit and the receiver unit operate at the same time, and the signal leaks from the transmitter unit to the receiver unit, so that the measurement accuracy is deteriorated. In particular, with the miniaturization of the radar apparatus, the distance between transmitter unit and the receiver unit is shorter, the influence of the leakage signal becomes significantly greater.

Known techniques disclose generating a signal whose phase is inverted with the same amplitude as the leakage signal from a transmitter unit to a receiver unit by performing amplitude adjustment and phase adjustment on the signal extracted from a transmission output, and adding the signal to the input of the receiver unit, thereby attempting to cancel out the leakage signal (see Japanese Unexamined Patent Publication No. 2007-71751, and WO 2016/031108).

SUMMARY

As in the known techniques, when a signal extracted from the output of the transmitter unit undergoes amplitude adjustment and phase adjustment, and its result is applied to the input of the receiver unit, the length of the signal wiring from the transmitter unit to the receiver unit which is usually spaced apart from the transmitter unit is increased. If, in particular, a high frequency signal such as a millimeter wave is transmitted using the transmission line, a large wiring area is required.

Moreover, a radar apparatus for measuring an angle as well as a distance and a velocity may include a plurality of transmitter circuits and a plurality of receiver circuits. In this case, all combinations of the transmitter circuits and the receiver circuits need to generate a signal for canceling out the leakage signal. However, to do so, the arrangement of signal wiring from the transmitter circuit to the receiver circuit becomes intricate. In addition, a high frequency circuit becomes complicated and requires a large area, resulting in difficulty in providing such a complicated radar apparatus.

The present disclosure attempts to provide a radar apparatus which effectively improves, with a smaller area, measurement accuracy degradation due to a leakage signal from a transmitter unit to a receiver unit.

In order to achieve the attempt, a radar apparatus according to the present disclosure includes: a local oscillator for outputting a local oscillation signal; a transmitter unit; and a receiver unit. The transmitter unit includes: a transmission input configured to receive the local oscillation signal; and a transmitter configured to transmit a transmission signal based on the local oscillation signal that has been received via the transmission input. The receiver unit includes: a reception input configured to receive the local oscillation signal not via the transmission input; a receiver configured to receive a reflection wave based on the transmission signal; a cancel signal generator configured to generate a cancel signal based on the local oscillation signal that has been received via the reception input; and an adder configured to superimpose the cancel signal on a reception signal.

According to the present disclosure, the cancel signal for canceling out the leakage signal is not the output from the transmitter unit, and is generated on the basis of the signal which the receiver unit has received from the local oscillator, not from the transmitter unit. Therefore, it is not necessary to provide a signal line between the transmitter unit and the receiver unit which are normally spaced apart from each other, so that the leakage signal can be canceled out effectively, with a smaller area.

DETAILED DESCRIPTION

Embodiments of the present disclosure will now be described in detail with reference to the drawings.

First Embodiment

Figure 1:
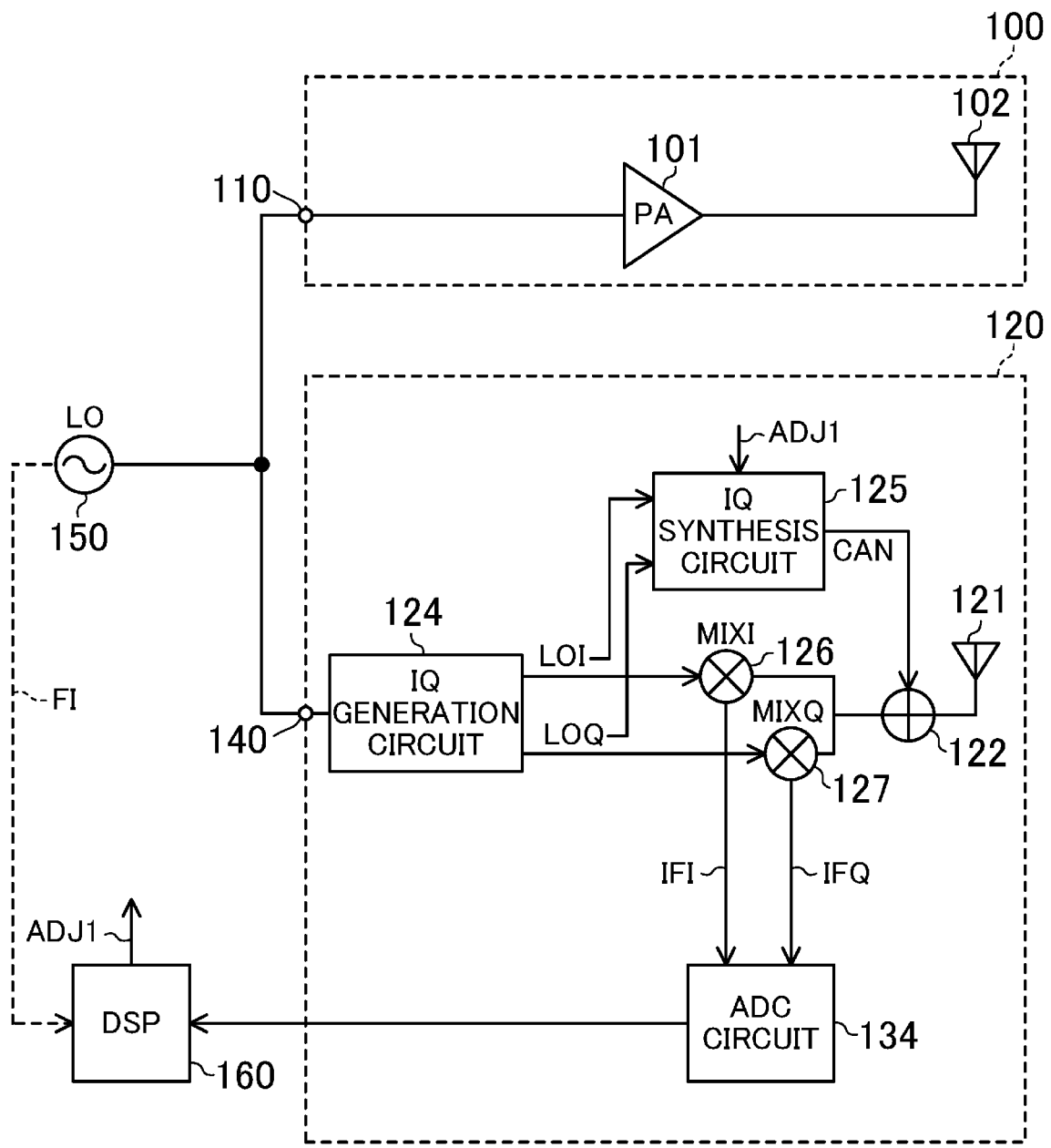
FIG. 1 is a circuit block diagram of a radar apparatus according to a first embodiment of the present disclosure.

FIG. 1 is a circuit block diagram of a radar apparatus according to a first embodiment of the present disclosure. The radar apparatus of FIG. 1 includes a transmitter unit 100, a receiver unit 120, a local oscillator (LO) 150 for outputting a local oscillation signal, and a digital signal processor (DSP) 160 for controlling the entire radar apparatus. The radar apparatus cancels out a leakage signal in the reception signal without connecting the transmitter unit 100 and the receiver unit 120 together using signal wiring.

The transmitter unit 100 includes: a transmission input 110 for receiving a local oscillation signal from the LO 150; a power amplifier (PA) 101 for amplifying the local oscillation signal received via the transmission input 110 to generate a transmission signal; and a transmission antenna 102 for transmitting the transmission signal as an electromagnetic wave toward the target.

The receiver unit 120 includes: a reception input 140 for receiving a local oscillation signal from the LO 150, not from the transmission input 110; a reception antenna 121 for receiving a reflection wave from a target based on the transmission signal; an adder 122; an IQ generation circuit 124; an IQ synthesis circuit 125; mixers (MIXI, MIXQ) 126 and 127, and an analog digital conversion (ADC) circuit 134. The reception antenna 121 may receive a leakage signal leaked from the transmission antenna 102.

The IQ generation circuit 124 generates a local oscillation signal having a phase difference of 90 degrees from the local oscillation signal received via the reception input 140, that is to say, the IQ generation circuit 124 generates an LOI signal and an LOQ signal having a phase difference of 90 degrees (from each other) with respect to the local oscillation signal received via the reception input 140. An input of the IQ synthesis circuit 125 is extracted from the output of the IQ generation circuit 124 by, e.g., capacitance coupling. The IQ synthesis circuit 125 generates a cancel signal (CAN signal) based on the LOI signal and the LOQ signal and in accordance with an IQ synthesis adjustment signal ADJ1 supplied from the DSP 160. The adder 122 superimposes the CAN signal on the reception signal so as to cancel out the leakage signal in the reception signal. Based on the LOI and LOQ signals, the mixers 126 and 127 perform frequency conversion of the output of the adder 122 into an IF signal in which the I component and the Q component are separated from each other, namely, an IFI signal and an IFQ signal (quadrature demodulation). The ADC circuit 134 converts each of the IFI signal and the IFQ signal into a digital signal, and outputs the digital signal to the DSP 160. Based on the output from the ADC circuit 134, the DSP 160 may analyze the reflected wave from the target to calculate the distance to the target and the moving velocity of the target.

The DSP 160 performs the operation of a calibration mode prior to the normal operation described above. That is to say, for the calibration of the IQ synthesis circuit 125, the DSP 160 obtains a setting value of the IQ synthesis adjustment signal ADJ1 having the minimum input level to the DSP 160, and stores the value as a correction value in the memory of the DSP 160. In the normal operation, an IQ synthesis adjustment signal ADJ1 obtained from the correction value in the memory can properly adjust the IQ synthesis circuit 125. The calibration may be not only performed at the initial time, but also repeated regularly or performed irregularly. A value obtained through an arithmetic operation on (e.g., calculation of a moving average of) the results of calibrations that have been performed regularly or irregularly a plurality of times or performed irregularly may be used as a correction value.

Figure 2:
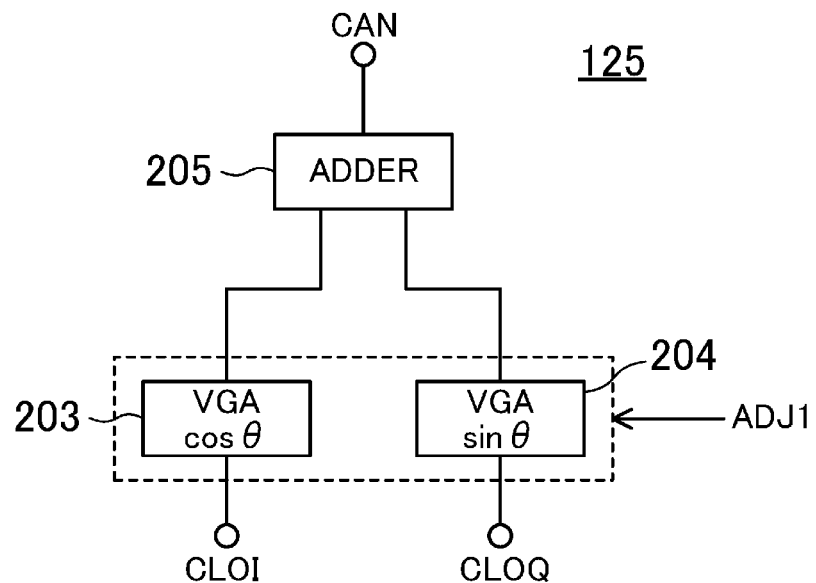
FIG. 2 is a circuit block diagram showing a specific exemplary configuration for an IQ synthesis circuit in FIG. 1.

FIG. 2 shows a specific exemplary configuration for the IQ synthesis circuit 125 in FIG. 1. The IQ synthesis circuit 125 in FIG. 2 includes two variable gain amplifiers (VGA) 203 and 204 and an adder 205. The VGA 203 adjusts the level of the signal based on the LOI signal (the signal received by the CLOI terminal via the capacitive coupling), and the VGA 204 adjusts the level of the signal based on the LOQ signal (the signal received by the CLOQ terminal via the capacitive coupling). The adder 205 finally adds amplitude-adjusted LOI and LOQ signals, thereby obtaining a CAN signal. At this time, the level adjustment of the outputs of both the VGAs 203 and 204, and selection of addition or subtraction in the adder 205 are performed in accordance with the IQ synthesis adjustment signal ADJ1.

Figure 3:
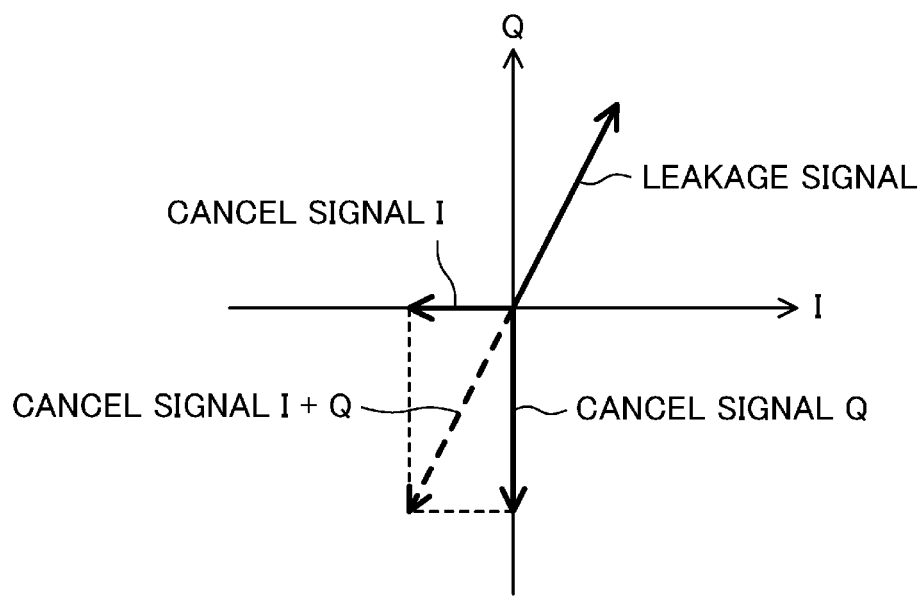
FIG. 3 is a vector diagram for explaining the operation of the IQ synthesis circuit of FIG. 2.

FIG. 3 is a vector diagram for explaining the operation of the IQ synthesis circuit 125 of FIG. 2. According to the IQ synthesis circuit 125 of FIG. 2, the amplitudes of each of the cancel signal I (=the signal based on the LOI signal) and the cancel signal Q (=the signal based on the LOQ signal) which have a phase difference of 90 degrees from each other are adjusted, thereby generating the cancel signal I+Q (=CAN signal) having the same amplitude as, and the opposite phase to, the leakage signal, as shown in FIG. 3.

As described above, according to this embodiment, the IQ synthesis circuit 125 generates, from the LOI signal and the LOQ signal, the CAN signal whose phase is opposite to that of the leakage signal from the transmitter unit 100 to the receiver unit 120 in accordance with the IQ synthesis adjustment signal ADJ1. The CAN signal is superimposed on the reception signal in the adder 122, so that leakage signal is canceled out. In this embodiment, in the receiver unit 120, the CAN signal for canceling out the leakage signal is generated based on the local oscillation signal which has been received from the LO 150. That is to say, in the receiver unit 120, the CAN signal for canceling out the leakage signal is configured so as not to be supplied from the transmitter unit 100. This eliminates the necessity of providing the signal wiring between the transmitter unit 100 and the receiver unit 120 which are normally spaced apart from each other, so that the leakage signal can be effectively canceled out with a smaller area.

Moreover, the DSP 160 performs the calibration operation, and an IQ synthesis ratio in the IQ synthesis circuit 125 can thus be adjusted with high accuracy, thereby effectively reducing the leakage signal.

Figure 4:
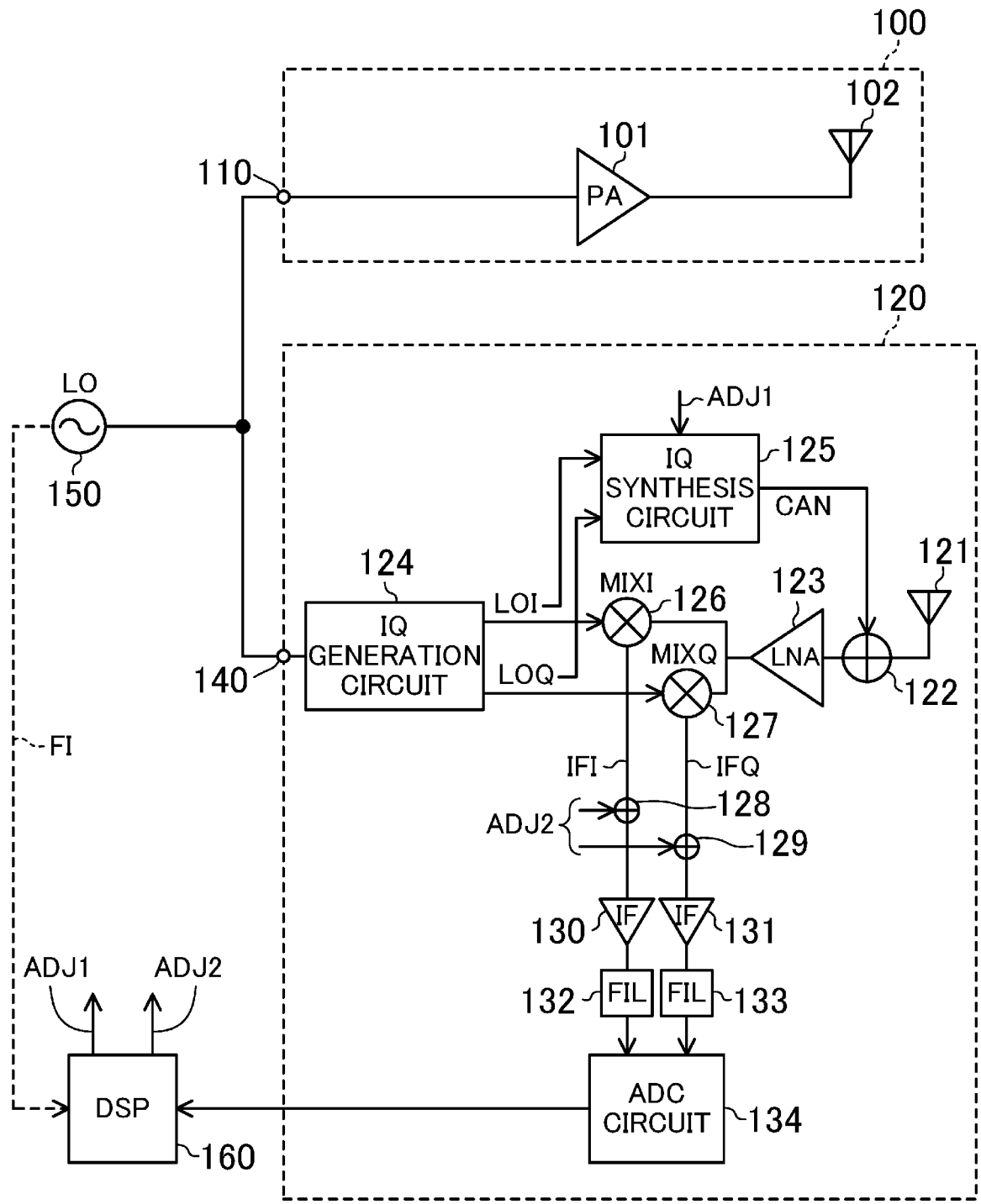
FIG. 4 is a circuit block diagram of a radar apparatus according to a variation of FIG. 1.

FIG. 4 is a circuit block diagram of a radar apparatus according to a variation of FIG. 1. In FIG. 4, a low noise amplifier (LNA) 123 is added between the adder 122 and the mixers 126 and 127. Further, an offset adder 128, an IF amplifier 130, and a filter 132 are added to the path of the IFI signal between the mixer 126 and the ADC circuit 134. An offset adder 129, an IF amplifier 131, and a filter 133 are added to the path of the IFQ signal between the mixer 127 and the ADC circuit 134. When the DSP 160 detects a residual DC component, the DSP 160 supplies an offset adjustment signal ADJ2 corresponding to the detected residual DC component to the offset adders 128 and 129.

According to the variation shown in FIG. 4, the LNA 123 and/or the IF amplifiers 130, 131 improve the signal quality (S/N), thereby broadening the detection range of the radar apparatus. Further, the offset adjustment signal ADJ2 performs offset adjustment, thereby suppressing an inaccurate DC component. This can improve detection performance. Further, the filters 132 and 133 remove an unnecessary signal, thereby improving detection performance.

In the configurations shown in FIGS. 1 and 4, either one of the mixers (MIXI, MIXQ) 126 and 127 can be omitted, or its operation can be stopped. This makes it possible to reduce the power consumption of the radar apparatus.

The respective portions of the radar apparatus are intermittently operated, thereby reducing the power consumption of the radar apparatus, too.

In a situation where the present disclosure is applied to a frequency-modulated continuous-wave (FMCW) radar apparatus, the following configuration may be adopted. That is to say, the LO 150 supplies the transmitter unit 100 and the receiver unit 120 with a local oscillation signal, the frequency of which is modulated, and sequentially supplies the DSP 160 with frequency information FI indicating the frequency of every moment during the frequency sweep, as indicated by broken lines in FIGS. 1 and 4. The DSP 160 adjusts the IQ synthesis adjustment signal ADJ1 in accordance with the frequency information FI. By changing an IQ synthesis ratio in accordance with the frequency information FI, the IQ synthesis circuit 125 can generate a CAN signal following the frequency change. This can reduce a decrease in, e.g., distance measurement accuracy even if the amplitude and phase of the leakage signal are changed due to a change in the transmission frequency.

Second Embodiment

Figure 5:
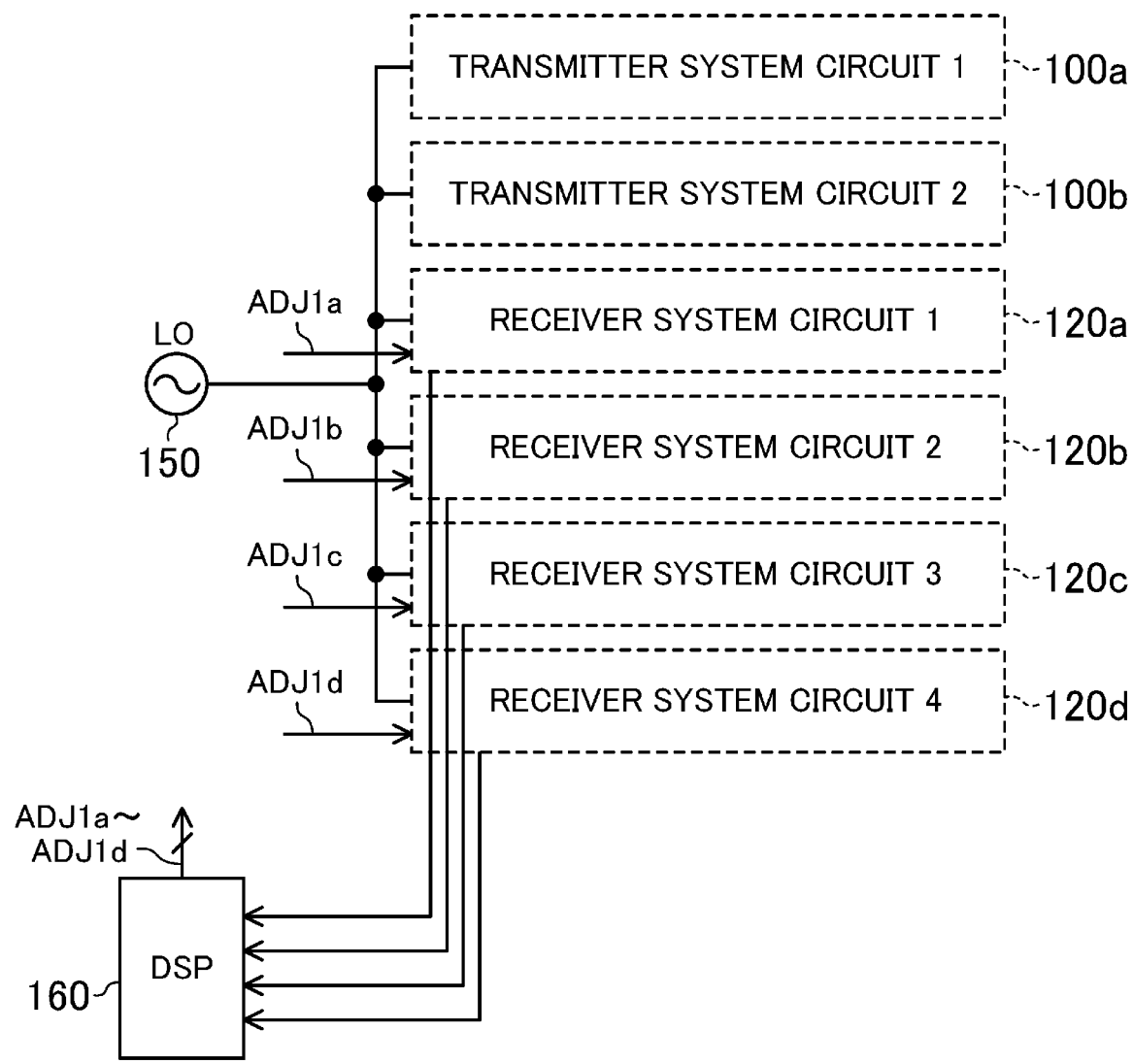
FIG. 5 is a circuit block diagram of a radar apparatus according to a second embodiment of the present disclosure.

FIG. 5 is a circuit block diagram of a radar apparatus according to a second embodiment of the present disclosure. The radar apparatus of FIG. 5 includes two transmitter circuits 100a and 100b each having the same configuration as the transmitter unit 100 shown in FIG. 1, four receiver circuits 120a, 120b, 120c, and 120d each having the same configuration as the receiver unit 120 shown in FIG. 1, an LO 150 for outputting a local oscillation signal, and a DSP 160 for controlling the entire radar apparatus. The DSP 160 supplies the four receiver circuits 120a, 120b, 120c, and 120d with IQ synthesis adjustment signals ADJ1a, ADJ1b, ADJ1c, and ADJ1d, respectively. Thus, the four receiver circuits 120a, 120b, 120c, and 120d can generate a cancel signal for canceling out the leakage signal based on the local oscillation signal received from the LO 150.

According to known techniques, a signal for canceling out the leakage signal needs to be generated for all combinations of the two transmitter circuits 100a and 100b and the four receiver circuits 120a, 120b, 120c, and 120d, i.e., eight combinations, so that the arrangement of signal wiring from the transmitter circuit to the receiver circuit becomes complicated. This problem is solved according to this embodiment.

At least one of the four receiver circuits 120a, 120b, 120c, or 120d in FIG. 5 may have the same configuration as the receiver unit 120 shown in FIG. 1 or 4.

Third Embodiment

Figure 6:
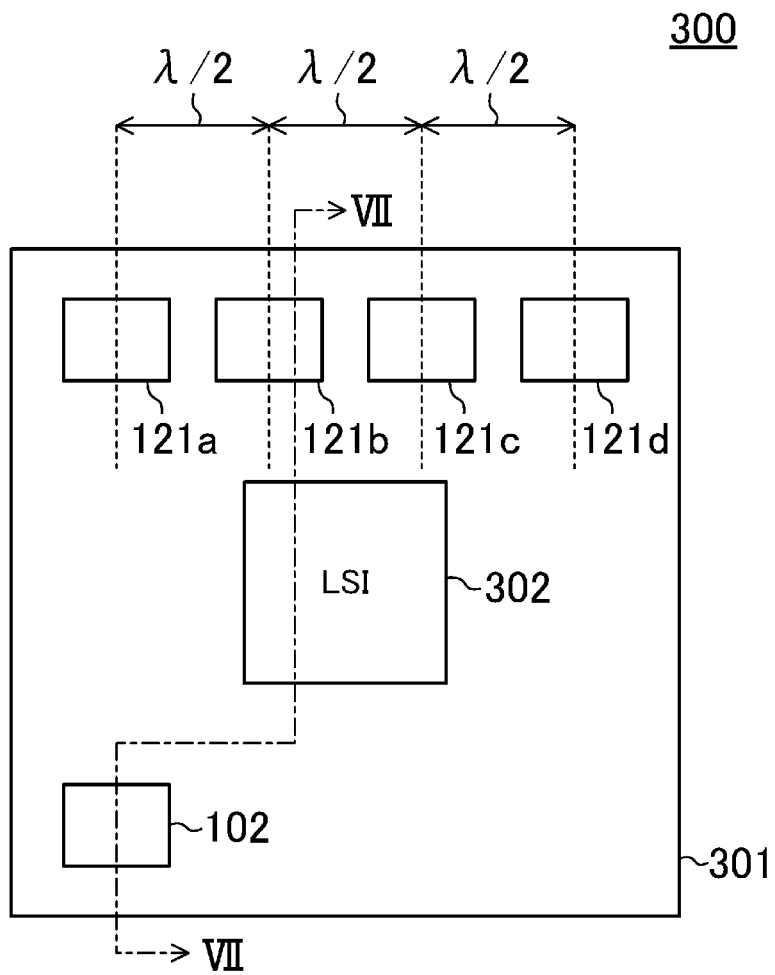
FIG. 6 is a plan view of a radar apparatus according to a third embodiment of the present disclosure.
Figure 7:
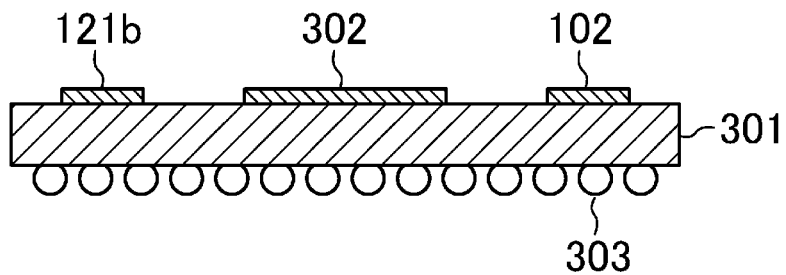
FIG. 7 is a cross-sectional view taken along line VII-VII of FIG. 6.

FIG. 6 is a plan view of a radar apparatus according to a third embodiment of the present disclosure. FIG. 7 is a cross-sectional view taken along line VII-VII of FIG. 6. The radar apparatus shown in FIGS. 6 and 7 is a radar apparatus in which all the circuits are formed as a radar module 300 of one small package. The radar apparatus includes: one transmitter circuit having the same configuration as the transmitter unit 100 in FIG. 1 or FIG. 4; four receiver circuits each having the same configuration as the receiver unit 120 in FIG. 1 or 4; an LO for outputting a local oscillation signal; and a DSP for controlling the entire radar apparatus.

FIGS. 6 and 7 show one transmission antenna 102 which is a planar antenna, four reception antennas 121a, 121b, 121c, and 121d which are planar antennas, a rectangular package substrate 301, a semiconductor integrated circuit (LSI) 302, and a solder ball 303. The LSI 302 includes the LO, the DSP, a part of the transmitter circuit except the transmission antenna 102, and a part of the four receiver circuits except the reception antennas 121a, 121b, 121c, and 121d.

The LSI 302 is disposed at the center of the package substrate 301. The reception antennas 121a, 121b, 121c, and 121d are arranged along one side of the package substrate 301 at equal space of about half the wavelength (λ/2) of the transmission signal. The transmission antenna 102 is disposed on another side, of the package substrate 301, opposite to the one side so as to be separated as far as possible from the reception antennas 121a, 121b, 121c, and 121d.

The package type of the radar module 300 may be any one of a ball grid array (BGA), a land grid array (LGA), a fan out wafer level package, and the like. In addition, at least one of the antennas may be formed by arranging a plurality of planar antennas in an array pattern or may be a dipole antenna.

As can be seen from the foregoing description, a radar apparatus according to the present disclosure can effectively reduce, with a smaller area, a decrease in measurement accuracy due to a leakage signal from a transmitter unit to a receiver unit, and is useful as a radar apparatus for distance measurement and velocity measurement.

What is claimed is:

1. A radar apparatus which includes: a local oscillator for outputting a local oscillation signal; a transmitter unit; and a receiver unit, wherein
   the transmitter unit includes:
      a transmission input configured to receive the local oscillation signal; and
      a transmitter configured to transmit a transmission signal based on the local oscillation signal that has been received via the transmission input,
   the receiver unit includes:
      a reception input configured to receive the local oscillation signal not via the transmission input;
      a receiver configured to receive a reflection wave based on the transmission signal;
      an IQ generation circuit which receives the local oscillation signal as an input, the IQ generation circuit configured to generate first and second local oscillation signals having a phase difference of 90 degrees;
      a cancel signal generator configured to generate a cancel signal by amplifying the first and second local oscillation signals based on an adjustment signal and then adding the amplified first and second local oscillation signals;
      an adder configured to perform superimposition of the cancel signal on a reception signal; and:
      a mixer configured to perform frequency conversion using the first and second local oscillation signals by receiving an output from the adder.

2. The radar apparatus of claim 1, wherein the cancel signal includes a plurality of cancel signals, and the cancel signal generator adjusts an amplitude of each of cancel signals I and Q among the cancel signals, the cancel signal I being based on the first local oscillation signal, the cancel signal Q having a phase difference of 90 degrees from the cancel signal I and being based on the second local oscillation signal.

3. The radar apparatus of claim 1, wherein a frequency of the local oscillation signal is modulated.

4. The radar apparatus of claim 3, wherein the cancel signal generator adjusts the cancel signal in accordance with frequency information of the local oscillation signal.

5. The radar apparatus of claim 1, wherein the receiver includes a low noise amplifier, and the adder performs the superimposition in a preceding stage of the low noise amplifier.

6. The radar apparatus of claim 1, further comprising:
   at least one transmitter circuit having a same configuration as the transmitter unit; and a plurality of receiver circuits each having a same configuration as the receiver unit.

7. The radar apparatus of claim 6, wherein all circuits are formed in one package.

8. The radar apparatus of claim 7, wherein the plurality of receiver circuits have reception antennas, and the reception antennas are planar antennas arranged on a package substrate.

9. A radar apparatus which includes: a local oscillator for outputting a local oscillation signal; at least one transmitter circuit; and a plurality of receiver circuits, wherein the at least one transmitter circuit includes:
- a transmission input configured to receive the local oscillation signal; and
- a transmitter configured to transmit a transmission signal based on the local oscillation signal that has been received via the transmission input, each of the receiver circuits includes:
- a reception input configured to receive the local oscillation signal not via the transmission input;
- a receiver configured to receive a reflection wave based on one of the transmission signals;
- an IQ generation circuit which receives the local oscillation signal as an input, the IQ generation circuit configured to generate first and second local oscillation signals having a phase difference of 90 degrees
- a cancel signal generator configured to generate a cancel signal by amplifying the first and second local oscillation signals based on an adjustment signal and then adding the amplified first and second local oscillation signals;
- an adder configured to perform superimposition of the cancel signal on a reception signal; and
- a mixer configured to perform frequency conversion using the first and second local oscillation signals by receiving an output from the adder.

10. The radar apparatus of claim 9, wherein the cancel signal includes a plurality of cancel signals, and the cancel signal generator adjusts an amplitude of each of cancel signals I and Q among the cancel signals, the cancel signal I being based on the first local oscillation signal, the cancel signal Q having a phase difference of 90 degrees from the cancel signal I and being based on the second local oscillation signal.

11. The radar apparatus of claim 9, wherein a frequency of the local oscillation signal is modulated.

12. The radar apparatus of claim 11, wherein the cancel signal generator adjusts the cancel signal in accordance with frequency information of the local oscillation signal.

13. The radar apparatus of claim 9, wherein the receiver includes a low noise amplifier, and the adder performs the superimposition in a preceding stage of the low noise amplifier.

14. The radar apparatus of claim 9, wherein all circuits are formed in one package.

15. The radar apparatus of claim 14, wherein the plurality of receiver circuits have reception antennas, and the reception antennas are planar antennas arranged on a package substrate.

* * * * *